US005479492A

United States Patent [19]

Hofstee et al.

[11] Patent Number: 5,479,492

[45] Date of Patent: Dec. 26, 1995

[54] TELEVOTING METHOD AND SYSTEM

[75] Inventors: Jan H. E. Hofstee, Bleijswijk; Petrus W. M. A. Hoogstraten, Dordrecht; Ad D. Kruif, The Hague, all of Netherlands

[73] Assignee: Koninklijke PTT Nederland N.V., Groningen, Netherlands

[21] Appl. No.: 159,724

[22] Filed: Dec. 1, 1993

[30] Foreign Application Priority Data

Dec. 4, 1992 [NL] Netherlands .......................... 9202106

[51] Int. Cl.$^{6}$ .......................... H04M 11/00; H04M 15/00

[52] U.S. Cl. .............................. 379/92; 379/93; 379/113; 379/133

[58] Field of Search .............................. 379/92, 93, 113, 379/133, 140, 200, 265, 266, 198, 45; 348/1, 2; 364/409

[56] References Cited

U.S. PATENT DOCUMENTS

| | | | |
|---|---|---|---|
| 4,151,370 | 4/1979 | Root | 379/92 |
| 4,696,029 | 9/1987 | Cohen | 379/92 |
| 4,935,951 | 6/1990 | Robinson et al. | 379/45 |
| 4,962,525 | 10/1990 | Beckh | 379/92 |
| 5,012,510 | 4/1991 | Schaubs et al. | 379/92 |
| 5,013,038 | 5/1991 | Luxenberg et al. | 379/92 |
| 5,120,076 | 6/1992 | Luxenberg et al. | 379/92 |

FOREIGN PATENT DOCUMENTS

| | | | |
|---|---|---|---|
| 0339469A2 | 11/1989 | European Pat. Off. . | |
| 63-193755 | 11/1988 | Japan | 379/92 |
| 1363147 | 8/1974 | United Kingdom . | |

*Primary Examiner*—Curtis Kuntz
*Assistant Examiner*—Jason Chan
*Attorney, Agent, or Firm*—Frishauf, Holtz, Goodman, Langer & Chick

[57] ABSTRACT

Televoting method in which a large number of subscribers (1) connected to a telecommunications network (2) are able to make a call to a subscriber number, referred to as televoting number, of a televoting processor (4) in order then to transmit their vote to said processor. At the calling subscribers' end, the probability of transmission of calls intended for the televoting number are deliberately reduced substantially in a random manner, either directly by 'balloting' or indirectly by random time delay. The system for carrying out this method comprises televoting devices (3) at the subscribers' (1) end, said subscribers having a balloting device which substantially reduces the probability of transmission of calls intended for the televoting number and/or a delaying device which postpones the transmission of calls intended for the televoting number by an arbitrary length of time. The system is intended to prevent an explosion of calls to the televoting processor in televoting, for example in TV programs.

10 Claims, 1 Drawing Sheet

TELEVOTING METHOD AND SYSTEM

BACKGROUND OF THE INVENTION

The invention relates to a televoting method and system, in which a large number of subscribers connected to a telecommunications network, such as a telephone network, are able to make a call to a subscriber number, hereinafter referred to as televoting number, of a televoting processor also connected to said network in order then to transmit their vote to said televoting processor.

It is known to use telephone sets as a terminal for carrying out 'televoting'. When this is done, a large number of people are asked to cast their vote by making use of their telephone set, in particular tone dialing set. Their 'vote' can be transmitted by dialling a certain number, the 'televoting number', which belongs to the 'televoting processor', usually a computer system, and then pressing, for example, one of the keys 0–9. The casting of a vote often relates to a radio or TV program which is being listened to or watched at that instant. A problem for the proprietor of the telephone network is the enormous quantity of telephone traffic within a short period ('traffic explosion') which accompanies such televoting. Thus, during a popular TV program in which an appeal is made to viewers at a certain moment by means of televoting, a situation may arise in which a few million call attempts are made in the course of a few minutes in order to be able to vote via the telephone, for example, for one of a number of people appearing in the TV program. Practical experience has shown that a public telephone network can become completely disrupted thereby.

SUMMARY OF THE INVENTION

The object of the invention is to provide a solution for the problem specified above. The invention is based on the insight that the number of calls to the televoting number can be drastically limited within a certain time by taking a random sample without adversely affecting the proportions in the votes cast. This can be done in two different ways, namely by random probability reduction and by random postponement of the vote transmission. In the first case, the probability that a vote is actually transmitted is arbitrarily reduced at the subscriber end, and in the second case, the transmission of the vote is arbitrarily delayed. In practice, the latter also results in a random probability reduction since the televoting processor will want to count the votes cast and calculate the results with a certain, usually fairly short, time (for example 10 or 20 minutes). The votes which reach the televoting processor when the latter is already engaged in calculating the results on the basis of the votes received after having received votes during a certain (effective) access time are no longer included in the count and therefore no longer have any effect on the result. In any case, that is also unnecessary if the number of votes received on time is large enough to be representative of all the votes cast. In the first option, the probability that a vote cast by a subscriber is actually included in the result to be calculated by the processor is reduced directly, either in the subscriber's home or, for example, in the subscriber's exchange, to which he is connected together with other subscribers. In the second option, the reduction is obtained indirectly, namely by delaying the votes at the subscriber's end, either at home or in the subscriber's exchange, and limiting votes received at the processor end in time or, as is also possible, in number. In both cases, the possibility that the network becomes overloaded as a consequence of a very large influx of votes in a short time is prevented. In the direct vote-reduction case, most of the votes are not transmitted, and in the indirect vote-reduction case, all the votes are in fact transmitted but are 'spread out' over a longer time. This latter option is attractive for the operator of the televoting processor since all the intended votes are also actually transmitted and it is therefore always possible for the operator to alter the number of votes involved in the calculation of the result (by lengthening or shortening the effective access time) or, for example, to be able to carry out a recalculation over a larger set of votes afterwards.

A system for carrying out the method specified above comprises, at the subscriber end, televoting devices, to each of which a subscriber or a group of subscribers is connected. Such a televoting device comprises a 'balloting device' which provides direct random probability reduction, or a delaying device which effects an indirect probability reduction. The televoting device is located at the subscriber's home. It is also possible to site the televoting device at the subscriber exchange. In that case, it is possible to arrange for the same device to serve more subscribers. Said device must therefore be of multi-user design; for example, the vote of only one subscriber or of only a few subscribers randomly chosen from the group of connected subscribers may be transmitted. The votes of the various subscribers may also be transmitted to the televoting processor with different arbitrary delays. The telephone number (televoting number) of the required televoting processor is dialed and the vote entered by means of the keyboard (or possibly, dial) of the subscriber's instrument. If the televoting device is sited in the subscriber's home, it is also possible to provide said device with a keyboard for keying-in the televoting number and the vote to be cast. It is also possible to incorporate the 'shortened dialing' facility in the televoting device, which allows the required televoting processor to be selected by keying in only (for example) one figure. The televoting device should have a detection device for detecting televoting numbers; if such a number is dialled by the subscribers, the balloting device and/or the delaying device is activated.

DESCRIPTION OF THE INVENTION

Figure 1:
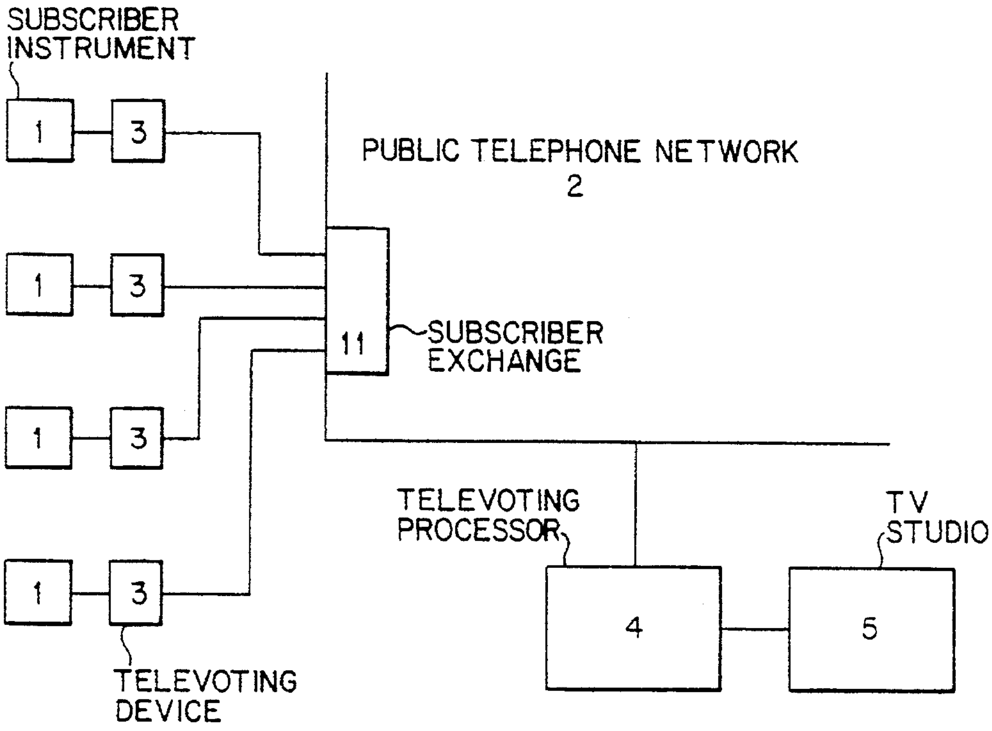
FIG. 1 shows an example of a system in accordance with the invention.

In FIG. 1, a number of subscriber instruments 1 are connected to the public telephone network 2. Connected to said telephone network 2 is also a computer system, the 'televoting processor' 4, which is connected to a TV studio 5. The telephone number of the televoting processor 4 will be referred to below as the 'televoting number'. The subscriber instruments 1 are connected to the network 2 via a televoting device 3. Said device 3 is completely passive provided telephone numbers dialled by the subscribers 1 are other than the televoting number; all the subscribers are therefore able to communicate with one another unimpeded. The situation becomes different if a subscriber dials the televoting number: in that case, his televoting device is activated. Subscribers will normally want to dial the televoting number if they are invited to do so by, for example, the presenter of a TV program, who invites the viewers/-subscribers to express, via their telephone set, their preference for, for example, one of a number of people appearing in said program. After said invitation has been made to the public, many will want to make use thereof, with the consequence that a very large number of telephone subscribers will dial the televoting number. As that instant, the televoting devices 3 of all the subscribers 1 are activated. Said devices will be described in still greater detail below. As already indicated above, there are two possibilities for preventing the traffic explosion instigated by the TV presenter, namely, at the subscriber end, either giving the subscribers 1 only a limited probability of actually making a call to the televoting number by means of the televoting device 3 or actually transmitting the call of each subscriber but after postponement by a randomly determined delay, as a result of which the calls are 'spread out' in time. In the first case, the subscriber did in fact intend to make a call to the televoting number but said call was not implemented with a probability of, for example, 90%, and in the second case, said call is in fact implemented with the associated transmission of the vote cast by the subscriber, but delayed to a greater or lesser extent. In the latter case, where a choice (vote) transmitted by the subscriber 1 is or is not included by the televoting processor 4 in the calculation of the result depends on the instant at which the vote arrives at the processor 4 and on the time that the processor 4 is accessible for receiving votes which are involved in the calculation. The processor 4 is effectively made available, for example, for 10 minutes after the TV presenter has announced the televoting. All the votes arriving in said 10 minutes are recorded in the processor 4. After 10 minutes, the collection of votes received is counted by the processor and the result is passed to the presenter in the TV studio 5. The votes received on the televoting number after said 10 minutes may also be recorded and possibly processed afterwards. Usually, however, there will be no point in also processing the votes received in addition. In both cases, the result of the televoting session is calculated on the basis of a random sample which is representative of all the votes cast by the subscribers. It is pointed out that, in the case where only a fairly small proportion (for example 10%) of the calls is transmitted by the televoting devices 3, in order not to adversely affect the enthusiasm for televoting (in any case, unjustly), it is also advisable to give the subscriber the impression that the call has in fact been implemented in the cases where the call has not been implemented (90%).

Figure 2:
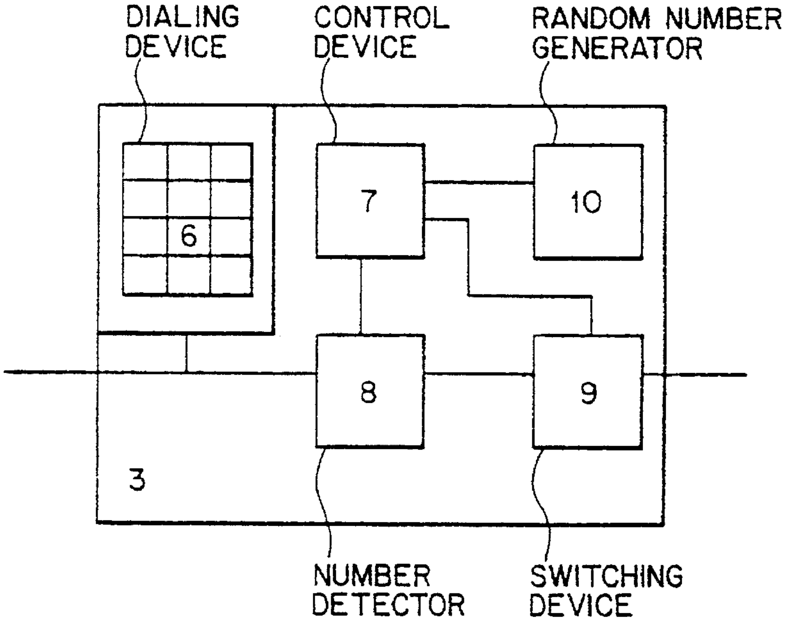
FIG. 2 shows an example of a televoting device.

The exemplary embodiment, shown in FIG. 2, of a televoting device 3 comprises a dialling device 6 (the known telephone keyboard), a control device 7, a number detector 8, a switching device 9 and a random-number generator 10. Detector 8 detects telephone numbers entered by the keyboard 6 (or by the keyboard of the subscriber instrument 1) and passes them to the control device 7, which compares them with one or more televoting numbers stored in said device 7. Provided telephone numbers entered are not identical to a televoting number, the televoting device 3 remains inactive and the switching device 9 passes all the signals originating from the subscriber instrument 1. However, as soon as a televoting number is dialled via the keyboard 6 of the televoting device 3 or that of the subscriber instrument 1, the switching device 9 is activated by the control device 7, as a result of which the call to the televoting number is not transmitted. The subscriber is informed by means of an LED or LCD (not shown) that the televoting number is complete and that the vote can then be cast by entering the FIGS. 0 to 9 (if 10 possibilities is inadequate, multi-figure numbers may also be used). This entry is then stored in the control device 7, and in the meantime, the random-number generator 10, activated by the control device 7, generates an arbitrary number, for example between 0 and 7,500. Depending on said random number, the control device 7 will, or will not, cause the switching device 9 to reinstate the connection and transmit the televoting number and the vote value chosen by the subscriber to the network 2. If, for example, the number emitted by the generator 10 is less than 300, the televoting number is transmitted and then, after the connection to the televoting processor 4 has been effected, the vote (in this case 0 . . . 9) entered by the subscriber; if the random value is greater than or equal to 300, the televoting number and the vote are not transmitted but erased in the control device, after which the switching device 9 is reset.

In order to prevent televoting numbers from being capable of being dialled by means of standard telephone sets not provided with a televoting device 3, such televoting numbers are preferably secret. Such secret televoting numbers may then be stored in the control device 7. At the beginning of a televoting session, the subscriber is able to activate the televoting device 3 by keying in a single figure, after which the control device, after generating a random number less than 300, generates the actual televoting number, which is then dialled.

In the above exemplary embodiment, the control device 7 therefore determines on the basis of the number generated by the random-number generator 10 whether the intended call to the televoting number is or is not implemented. As already indicated above, another possibility is that the random-number generator 10 generates a number which is a measure of the time by which the call to the televoting number is postponed. These two options can also be used simultaneously by, for example, only connecting calls to the network 2 (by means of device 9) if the random number value is less than 300 and in that case only transmitting said calls after the elapse of a delay time which corresponds to the generated random number. In this way, the number of actual calls is limited while the calls are at the same time also 'spread out' in time.

Finally, it is pointed out, possibly needlessly, that the balloting mentioned above is formed by the random-number generator 10, together with the control device 7, which, after all, transmits, or does not transmit, the intended call and vote depending on the random number generated. The delay device mentioned above is likewise formed by the random number generator 10 and the control device 7 since, after all, the control device 7 postpones the transmission of the call and the vote, depending on the value of the random number. As was indicated, these two options are even combined by combining the random-number generator 10 and the control device 7, as a result of which a combined balloting and delaying device is formed. In addition to that function, the control device 7 also provides, in addition, further control functions, such as monitoring, together with the detection device 8, the telephone numbers dialled and activating and deactivating the switching device. The control device 7 can be formed by a commercially available microprocessor or a 'customized' microprocessor.

It is clear that the invention is not exclusively applicable to a telephone system but can equally well be used in other networks, for example a data network with data terminals, PCs and the like connected to it. The application of the invention is also not limited to televoting associated with radio and TV programs, but also extends to other fields in which 'public consultation' takes place, such as, for example, the election of political bodies. Furthermore, it is also possible to locate the televoting device 3 at a subscriber exchange 11, as shown in FIG. 1.

We claim:

1. A televoting method, in which a large number of subscribers connected to a telecommunications network are able to make a call to a subscriber number, hereinafter referred to as televoting number, of a televoting processor also connected to said network in order then to transmit their vote to said televoting processor, characterized in that the probability of transmission of calls intended for the televoting number is deliberately reduced substantially in a random manner at the calling subscribers' end wherein said reduction in the probability of transmission of calls comprises the steps of:

determining locally at each one of the subscribers that the televoting number has been selected by said one subscriber to make a call;

generating a random number; and preventing transmission of the call to the televoting number based on the value of the generated random number.

2. A televoting system, in which a large number of subscribers connected to a telecommunications network are able to make a call to a subscriber number, hereinafter referred to as televoting number, of a televoting processor also connected to said network in order then to transmit their vote to said televoting processor, characterized by televoting devices (3) which each comprise a local random balloting device which substantially reduces in a random manner the transmission probability of calls intended for the televoting number wherein the local random balloting device is located at each one of the subscribers and comprises:

a detector for determining whether a subscriber has selected the televoting number to make a call;

a random number generator; and a switching circuit coupled to the random number generator for blocking transmission of the call to the televoting number based on the value of a number produced by the random number generator.

3. A televoting system, in which a large number of subscribers connected to a telecommunications network are able to make a call to a subscriber number, hereinafter referred to as a televoting number, of a televoting processor also connected to said network in order then to transmit their vote to said televoting processor, characterized by televoting devices (3) which each comprise a local random delaying device which postpones the transmission of calls intended for the televoting number by a random length of time wherein the local random delaying device is located at each one of the subscribers and comprises:

a detector for determining whether a subscriber has selected the televoting number to make a call;

a random number generator; and a switching circuit coupled to the random number generator for delaying transmission of the call to the televoting number based on the value of a number produced by the random number generator.

4. The system according to claim 2 or 3, characterized in that said televoting devices (3) are each incorporated between a subscriber instrument (1) and the network (2).

5. The system according to claim 2 or 3, characterized in that said televoting devices (3) are each connected to a subscriber connection of the network (2) and comprise an input device (6) for entering the required televoting number or the vote to be transmitted to the televoting processor (4).

6. The system according to claim 2 or 3, characterized in that said televoting devices (3) are incorporated within a network unit (11) to which, on the one hand, a group of subscribers is connected and which, on the other hand, is connected to the remainder of the network (2).

7. The system according to claim 2, characterized in that said televoting devices (3) comprise detection means (8) for detecting one or more televoting numbers, and control means (7) for activating the balloting device after such a televoting number has been detected.

8. A televoting device, in particular intended for a televoting system, in which a large number of subscribers connected to a telecommunications network are able to make a call to a subscriber number, hereinafter referred to as televoting number, of a televoting processor also connected to said network in order then to transmit their vote to said televoting processor, characterized by a local random balloting device which substantially reduces in a random manner the transmission probability of calls intended for a televoting number wherein the local random balloting device is located at each one of the subscribers and comprises:

a detector for determining whether a subscriber has selected the televoting number to make a call;

a random number generator; and a switching circuit coupled to the random number generator for blocking transmission of the call to the televoting number based on the value of a number produced by the random number generator.

9. A televoting device in particular intended for a televoting system, in which a large number of subscribers connected to a telecommunications network are able to make a call to a subscriber number, hereinafter referred to as televoting number, of a televoting processor also connected to said network in order then to transmit their vote to said televoting processing, characterized by a local random delaying device which postpones calls intended for a televoting number by an arbitrary length of time wherein the local random delaying device is located at each one of the subscribers and comprises:

a detector for determining whether a subscriber has selected the televoting number to make a call:

a random number generator; and a switching circuit coupled to the random number generator for delaying transmission of the call to the televoting number based on the value of a number produced by the random number generator.

10. The system according to claim 3, characterized in that said televoting devices (3) comprise detection means (8) for detecting one or more televoting numbers, and control means (7) for activating the delaying device after such a televoting number has been detected.

* * * * *